L. S. SAWYER.
BELT FASTENER.
APPLICATION FILED MAY 19, 1916.
1,223,116.  
Patented Apr. 17, 1917.
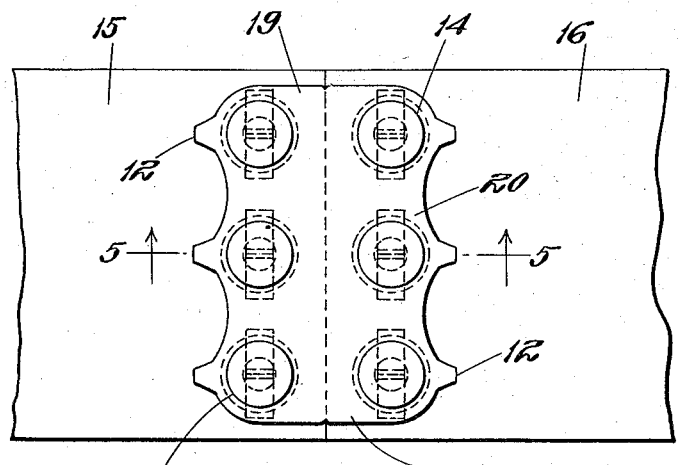
Fig_4_
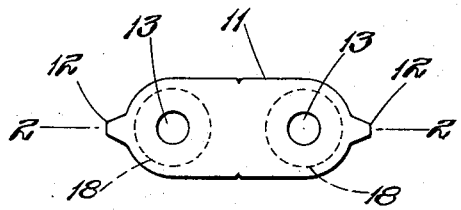
Fig_1_
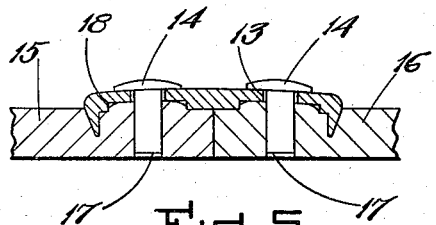
Fig_5_
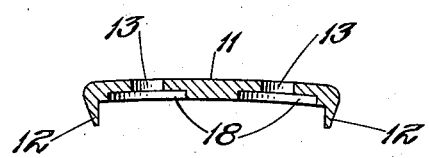
Fig_2_
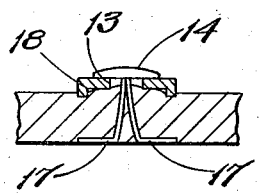
Fig_6_
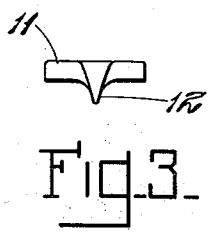
Fig_3_
INVENTOR:
Louis S. Sawyer
by Macleod, Calver, Copeland &c.
Attys_

UNITED STATES PATENT OFFICE.

LOUIS S. SAWYER, OF LYNN, MASSACHUSETTS.

BELT-FASTENER.

1,223,116.  Specification of Letters Patent.  Patented Apr. 17, 1917.

Application filed May 19, 1916. Serial No. 98,644.

*To all whom it may concern:*

Be it known that I, LOUIS S. SAWYER, a citizen of the United States, residing at Lynn, county of Essex, State of Massachusetts, have invented a certain new and useful Improvement in Belt-Fasteners, of which the following is a specification, reference being had therein to the accompanying drawings.

My invention has for its object an improved belt fastener by means of which the proximate ends of a belt, whether of leather, rubber, fabric, or of a combination of these materials may be quickly and securely fastened together. Heretofore in fastenings of this type, great difficulty has been experienced because the strain comes on the rivets or studs by means of which the belt fastener is secured to the ends of the belt so that in the continued use of the belt the studs or rivets work loose and eventually the ends of the belt tear out. My invention affords a belt fastener so constructed that the strain on the belt fastener as well as on the rivets or studs and therefore the tendency to tear out is practically done away with. I find by experience from the use of belt fastenings embodying my invention that belts, when fastened by them will run for an indefinite time without showing signs of tearing out.

The invention will be fully understood when taken in connection with the accompanying drawings and the novel features thereof will be pointed out and clearly defined in the claims at the close of this specification.

Referring to the drawings Figure 1 is a top plan view of a fastener embodying my invention.

Fig. 2 is a section on line 2—2 of Fig. 1.

Fig. 3 is an end view of a belt fastener shown in Fig. 1.

Fig. 4 is a top plan view of a series of three belt fasteners embodying my invention and formed in a single piece, said belt fasteners being secured in place on the ends of the belt.

Fig. 5 is a section on line 5—5 of Fig. 4 looking in the direction of the arrows.

Fig. 6 is a transverse section of a single fastener in place in a belt.

Referring now to the drawings (see Figs. 1–3 inclusive) there is shown at 11 a belt fastener unit which consists of a piece of suitable material curved slightly longitudinally as shown in Fig. 2. The ends are rounded and at each end there is a down turned prong 12 (see Fig. 3) which has a sharp point and which can therefore be quickly engaged with material of the belt by being pounded in. At 13, 13 are shown holes for the insertion of rivets or studs 14 by means of which the belt fastener is secured to the belt. The two ends of the belt are shown in Figs. 4, 5 and are designated 15, 16. The studs 14 are preferably formed with prongs 17 which may be spread and hammered down into engagement with the belt as shown in Fig. 6. These studs compress the ends of the belt against the under side of the fasteners. On the under side of the belt fastener and surrounding the holes 13, 13 are two countersinks or depressions 18 the edges of which are preferably sharp.

In Fig. 4, I have shown a series of three belt fasteners formed into a single piece for use on a belt of corresponding width. Each of the fastenings 19, 20 and 21 is made as previously described. It will be understood that any number of the fastener units may be made into a single piece.

While I have shown the rivets or studs 14 with their heads on the outside of the belt and the prongs on the inside, it will be understood that they may be put through from the other side, it being necessary only that they compress the belt into the countersinks in the fastener.

When the belt fastener is to be put in place, the two ends of the belt to be joined are brought together so that they will butt against each other and the belt fastener is laid in place. The belt fastener is then hammered down into the belt causing the prongs 12 to sink into the belt and the upper surface of the belt to be compressed into the countersinks 18 on the under side of the belt fastener. The studs or rivets 14 are then driven through the belt and the ends turned over the countersinks on the under side of the belt fastener. The result is that the ends of the belt are held partly by the studs and partly by the engagement between the surface of the belt and the under side of the belt fastener.

It will be seen, therefore, that the strain on the material of which the belt is composed is distributed over a considerable area, instead of being concentrated about the studs and rivets, and that the durability of the belt is therefore much increased.

What I claim is:

1. A metallic plate for a belt fastener having at each of two opposite ends a downwardly extending prong to penetrate the two proximate belt members, said plate having two apertures intermediate said prongs for the passage of fastening studs through the respective belt members, each of said apertures merging abruptly into a recess of larger diameter than said aperture on the under side of the plate, said recess being embordered by a sharp edged shoulder which penetrates the belt member to a somewhat less depth than the prongs.

2. A metallic plate for a belt fastener having at each of two opposite ends a downwardly extending prong to penetrate the two proximate belt members, said plate having recesses in the under face thereof adjacent said two opposite prongs, but a short distance away therefrom, the plate being of greater thickness in the portions which surround said recesses than the recessed portion, the margin of each of said recesses on the under side being formed with a sharp corner, and said plate being also formed with an aperture opening into each of said recesses for the passage of a fastening stud.

In testimony whereof I affix my signature.

LOUIS S. SAWYER.

Copies of this patent may be obtained for five cents each, by addressing the "Commissioner of Patents, Washington, D. C."